(12) United States Patent
Botelho et al.

(10) Patent No.: US 9,405,761 B1
(45) Date of Patent: Aug. 2, 2016

(54) TECHNIQUE TO DETERMINE DATA INTEGRITY FOR PHYSICAL GARBAGE COLLECTION WITH LIMITED MEMORY

(71) Applicant: EMC Corporation, Hopkinton, MA (US)

(72) Inventors: Fabiano C. Botelho, Sunnyvale, CA (US); Hung Hing (Anthony) Pang, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 297 days.

(21) Appl. No.: 14/065,812

(22) Filed: Oct. 29, 2013

(51) Int. Cl.
*G06F 17/30* (2006.01)

(52) U.S. Cl.
CPC .... *G06F 17/30138* (2013.01); *G06F 17/30091* (2013.01); *G06F 17/30156* (2013.01); *G06F 17/30371* (2013.01)

(58) Field of Classification Search
CPC .................... G06F 17/30091; G06F 17/30156; G06F 17/30371
USPC .................................................. 707/693, 813
See application file for complete search history.

(56) References Cited

U.S. PATENT DOCUMENTS

| | | | |
|---|---|---|---|
| 7,788,220 B1 | 8/2010 | Auchmoody et al. | |
| 8,028,009 B1 * | 9/2011 | Patterson | G06F 12/0269 707/649 |
| 2012/0089700 A1 * | 4/2012 | Safruti | H04L 67/2842 709/217 |
| 2012/0323859 A1 | 12/2012 | Yasa et al. | |
| 2015/0143032 A1 * | 5/2015 | Hashimoto | G06F 3/061 711/103 |

OTHER PUBLICATIONS

U.S. Appl. No. 13/909,871, Botelho, et al., filed Jun. 4, 2013, 36 pages.
Belazzougui, Djamal, et al., "Hash, displace, and compress," ESA 2009, 17 pages.
Botelho, Fabiano C., et al., "Practical Perfect Hashing in Nearly Optimal Space," Inf. Syst. 38(1), 2013, 30 pages.

* cited by examiner

*Primary Examiner* — Joshua Bullock
(74) *Attorney, Agent, or Firm* — Blakely, Sokoloff, Taylor & Zafman LLP

(57) ABSTRACT

Exemplary methods for verifying data integrity for garbage collection with limited memory include maintaining a data structure that includes a plurality of entries, storing states of a group of segments compressed therein. In response to receiving a request for transitioning a segment from a first state to a second state, retrieving a first entry value of an entry associated with the first segment, generating a second entry value based on the first entry value, the first state, the second state, and a value obtained from a first lookup table based on the first segment. The methods also include writing back the second entry value to the first entry of the data structure. In one embodiment, in response to determining all entries of the data structure reach a predetermined final state, performing a garbage collection process on the segments stored in the storage system.

21 Claims, 13 Drawing Sheets

TECHNIQUE TO DETERMINE DATA INTEGRITY FOR PHYSICAL GARBAGE COLLECTION WITH LIMITED MEMORY

RELATED APPLICATION

This application is related to co-pending U.S. patent application Ser. No. 13/909,875, filed Jun. 4, 2013, which is incorporated by reference herein in its entirety.

FIELD OF THE INVENTION

Embodiments of the present invention relate generally to data storage systems. More particularly, embodiments of the invention relate to determining data integrity for garbage collection of data storage systems with limited memory.

BACKGROUND

In a deduplicated file system, such as Data Domain® deduplicated storage system available from EMC® Corporation of Hopkinton, Mass., there are two components responsible to manage the files in the system. The first one is directory manager (DM), which is a hierarchical mapping from the path to the inode representing a file. The second one is content store (CS), which manages the content of the file. Each file has a content handle (CH) that is stored in the inode that is created by CS every time the file content changes. Each CH represents a file that is abstracted as a Merkle tree of segments. A file tree can have up to multiple levels, such as 7 levels: L0, . . . , L6. The L0 segments represent user data and are the leaves of the tree. The L6 is the root of the segment tree. Segments from L1 to L6 are referred to as metadata segments or Lp segments. They represent the metadata of a file associated with a file tree. An L1 segment is an array of L0 references. Similarly an L2 is an array of L1 references and so on.

A segment is considered live if it can be referenced by any live content in the file system. The file system packs the segments into containers, which are written to disk in a log-structured manner. Each container is structured into sections. The first section is the metadata section and the following sections are referred to as compression regions (CRs). A CR is a set of compressed segments. In the metadata section there are all the references or fingerprints that identify the segments in the container. A field called content type is also stored therein, which describes the content of the container. For instance, it describes which compression algorithm has been used, which type of segments the container has (L0, . . . , L6), etc. There is a container manager that is responsible to maintain the log-structured container set and provide a mapping from container identifiers (CID) to block offset on disk. This mapping is entirely stored in memory. It also contains additional information, e.g., the content type of each container. Hence, it is easy to traverse the container manager metadata and filter containers to load from disk based on their content type. For instance, processing logic can traverse the entire container set and only read containers that have L6 segments in them.

A cleaning process (also referred to as a garbage collection process) of the file system is responsible for enumerating all live segments in the live content handles of the file system. Prior to performing a physical garbage collection, data integrity of the segments must be verified to avoid any data corruption. Conventionally, each segment to be enumerated is represented by a bit in a walk vector and a bit in a read vector. Thus, in a conventional storage system with limited memory, the garbage collection process may be required to be performed multiple times. Accordingly, there has been a lack of efficient mechanism for verifying data integrity of data storage systems with limited memory.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
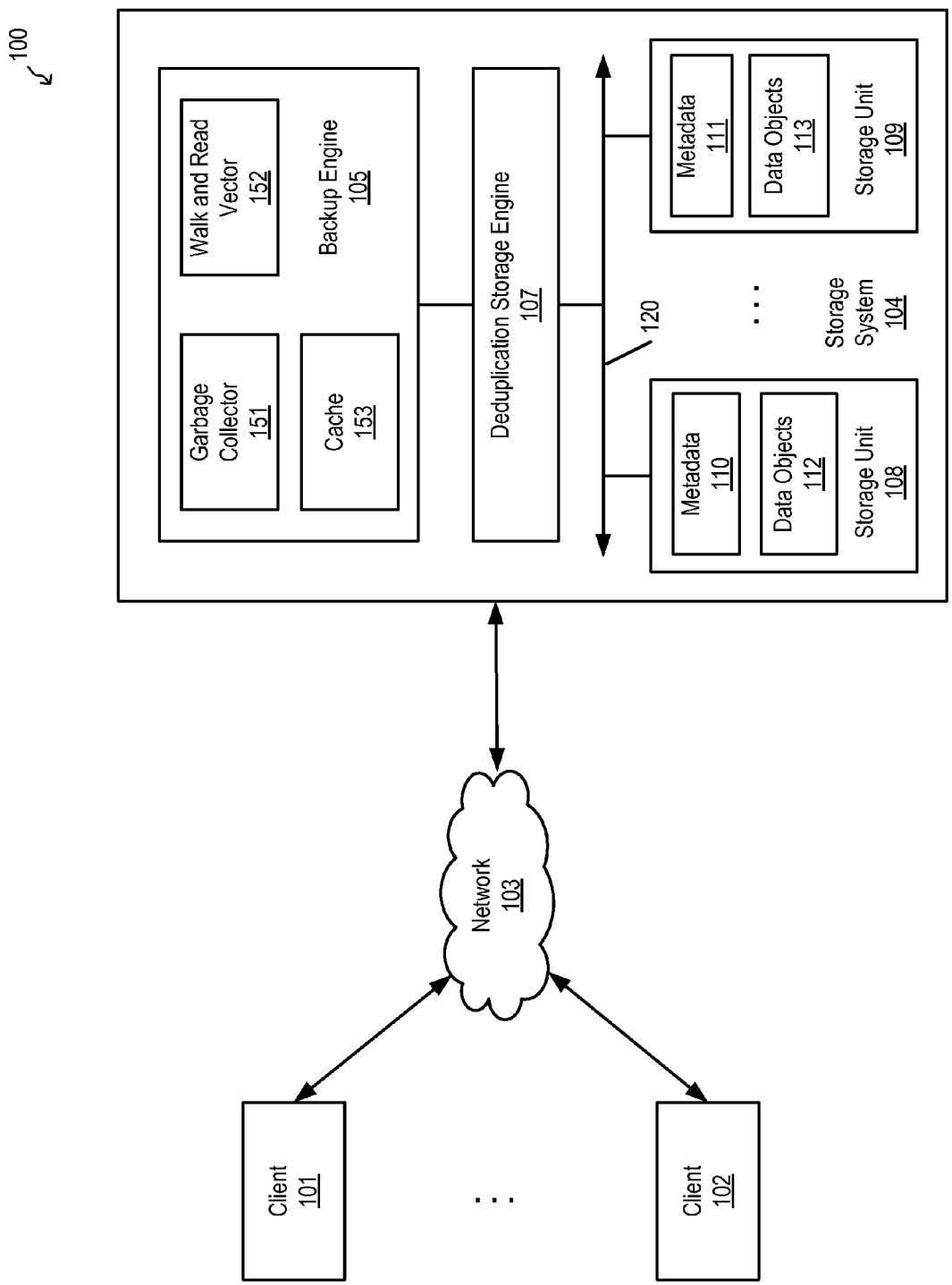
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a garbage collection process is performed based on physical segments of a file system namespace on a breadth-first approach. Prior to performing the garbage collection, data integrity of the segments is verified to ensure that there is no data corruption amongst the segments. Segments of a namespace of a file system are traversed in a breadth-first manner, in which segments are scanned in a level-by-level fashion, starting from a top level (also referred to as a root level or top parent level) to a bottom level, physically instead of on a file-by-file basis (e.g., depth-first). For each level, two checksums are maintained: parent checksum and child checksum. When fingerprints of current level segments are reached, either from content handles or from a parent level segment of the current level, a segment state block associated with the segment in a walk and read vector for each current level segment is set to a predetermined value (i.e., state) to indicate a walk operation has been performed on the corresponding segment. Setting the state in the segment state block prevents the walk operation from being performed more than once on the same segment. A checksum is calculated for each fingerprint of the current level and added to the parent checksum of the current level and a parent counter is incremented. As used herein, a "walk operation" refers to calculating a checksum for the fingerprint, adding the checksum to the parent checksum, and incrementing the parent counter of the current level.

In addition, a fingerprint of each current level segment is retrieved from the storage and the segment state block associated with the segment in the walk and read vector is updated to predetermined state value to indicate that the segment has been walked and read. Updating the state information in the segment state block prevents the read operation from being performed more than once on the same segment. A checksum of the retrieved fingerprints is calculated and added to a child checksum of the current level, and a child counter is incremented. As used herein, a "read operation" refers to calculating a checksum of the retrieved fingerprints that have been read from the storage, adding the checksum to the child checksum of the current level, and incrementing the child counter of the current level.

When all segments of the current level have been traversed, data portions of the current level segments are retrieved from the storage and the child level becomes a new current level and the above traversal process is iteratively performed, until all segments have been processed as indicated by the walk and read vectors. Thereafter, if the walk and read operations for all segments are determined to be successful, the garbage collection process can be performed. As used herein, "successful walk and read operations" means all the segment state blocks indicate all segments have reached a predetermined final state. In at least one embodiment, "successful walk and read operations" also means that all the parent and child checksums of each level match, and that the parent and child counters of each level match.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network.

In response to a data file to be stored in storage units 108-109, deduplication storage engine 107 is configured to segment the data file into multiple segment according to a variety of segmentation policies or rules. Deduplication storage engine 107 may choose not to store a segment in a storage unit if the segment has been previously stored in the storage unit. In the event that deduplication storage engine 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

According to one embodiment, backup engine 105 includes garbage collector 151 configured to perform a garbage collection process on storage units or devices 108-109 to reclaim any storage space of segments that have not been referenced or used by any file in the file system. According to some embodiments, garbage collector 151 performs a data integrity verification process and if there is no data corruption, performs a garbage collection process based on physical segments of a file system namespace on a breadth-first approach. In the breadth-first approach, the segments are traversed on a level-by-level manner, from a top level (also referred to as a root level or top parent level) to a bottom level, physically instead of on a file-by-file basis. Each segment may be traversed once even through such a segment may be referenced or shared by multiple files.

According to one embodiment, prior to performing the garbage collection, data integrity of the segments is verified by garbage collector 151 to ensure that there is no data corruption amongst the segments. Segments of a namespace of a file system are traversed in a breadth-first manner, in which segments are scanned in a level-by-level fashion, starting from a top level (also referred to as a root level or top parent level) to a bottom level, physically instead of on a file-by-file basis (e.g., depth-first). For each level, two checksums (not shown) are maintained: parent checksum and child checksum. When fingerprints of current level segments are received, either from content handles or from a parent level segment of the current level, a segment state block associated with the segment in walk and read vector 152 for each current level segment is set to a predetermined value (i.e., state) to indicate a walk operation has been performed on the corresponding segment. Setting the state in the state block prevents the walk operation from being performed more than once on the same segment. A checksum is calculated and added to the parent checksum of the current level and a parent counter is incremented.

In addition, a fingerprint of each current level segment is retrieved from the storage and the segment state block associated with the segment in walk and read vector 152 is updated to predetermined value (i.e., state) to indicate that the segment has been walked and read. Updating the state information in the segment state block prevents the read operation from being performed more than once on the same segment. A checksum of the retrieved fingerprints is calculated and added to a child checksum (not shown) of the current level, and a child counter is incremented. When all segments of the current level have been traversed, data portions of the current level segments are retrieved from the storage and the child level becomes a new current level and the above traversal process is iteratively performed, until all segments have been processed as indicated in walk and read vector 152. Thereafter, the parent checksum and the child checksum of each level are compared, as well as their parent counter and child counter. If they are all matched (i.e., the walk and read operations are successful) the garbage collection process can be performed.

In one embodiment, a walk and/or read operation is performed on a segment if the walk and/or read operation have not yet been performed. In one embodiment, garbage collector 151 determines if the walk and/or read operation have been performed based on the state information encoded/compressed in walk and read vector 152. In one aspect of the invention, the encoded/compressed state information stored in walk and read vector 152 is decoded/uncompressed using a pre-computed lookup table (not shown), which can be stored in cache 153.

Figure 2:
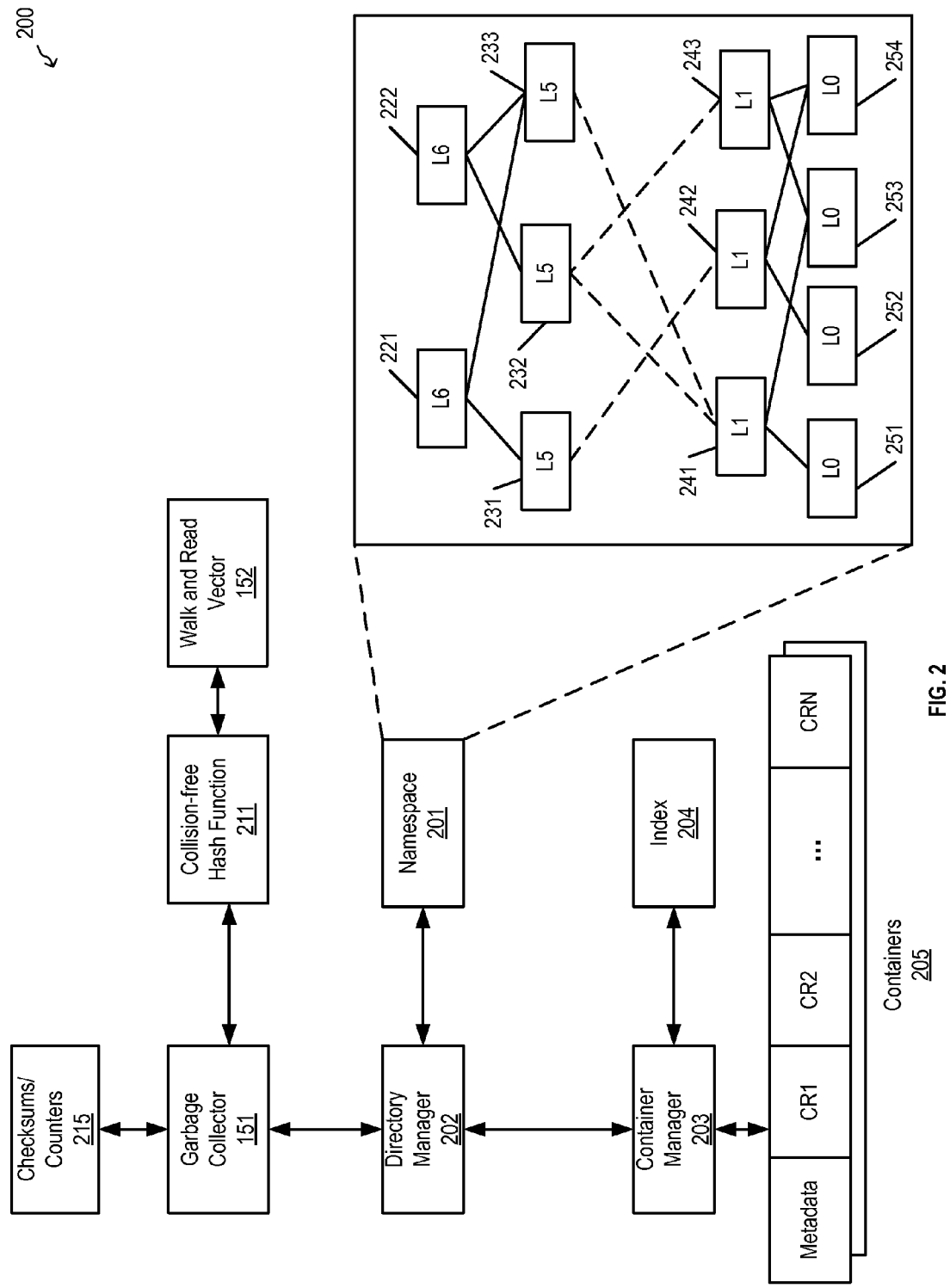
FIG. 2 is a block diagram illustrating a storage system according to one embodiment of the invention.

FIG. 2 is a block diagram illustrating a storage system according to one embodiment of the invention. System 200 may be implemented as part of storage system 104 of FIG. 1. FIG. 2 illustrates mechanisms of the present invention for performing walk and read operations in a storage system with limited memory. Certain aspects of the walk and read operations are described in the above incorporated by reference application. For the convenience of the reader, however, some of the previously described mechanisms will be recited here.

Referring now to FIG. 2, garbage collector 151 traverses namespace 201 via directory manager 202, where directory manager 202 is configured to manage files stored in a file system of the storage system. In a deduplicated file system, a file may be represented in a file tree having one or more levels of segments in a multi-level hierarchy. In this example, there are seven levels L0 to L6, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments (e.g., L0 segments) are the actual data segments containing the actual deduplicated segments. L1 to L6 are segments that contain only metadata of their respective child segments(s). Throughout the description, L1 to L6 segments are referred to as Lp segments.

In one embodiment, when garbage collector 151 traverses namespace 201 via directory manager 202, garbage collector 151 obtains the fingerprints of the root level segments, in this example, L6 segments, as part of content handles from namespace 201. Based on the fingerprints of the current level segments, container manager 203 can identify which of containers 205 the segments are stored in. In one embodiment, processing logic scans the container manager metadata (e.g., content type), which may be maintained in memory. For each segment of the type currently scanned for, the processing logic reads its metadata section, determines what CRs to read, and reads those CRs and process the segments therein. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring still to FIG. 2, in this example, segment 221 includes a fingerprint of fingerprints of segments 231 and 233, and segment 222 includes a representation (e.g., a fingerprint) of fingerprints of segments 232-233, and so on. Some of the segments, such as segment 233, are referenced by multiple parent level segments (e.g., segments 221-222). Thus, segments 221-222, 231-233, and 241-243 only contain data representing the metadata of their respective child segments. Only segments 251-254 contain the actual user data.

As described above, prior to performing a garbage collection, data integrity of the segments must be verified. The data integrity of segments is verified by traversing the segments in a breadth-first approach, in which segments are scanned in a level-by-level fashion, starting from a top level (also referred to as a root level or top parent level) to a bottom level, physically instead of on a file-by-file basis (e.g., depth-first). In this example as shown in FIG. 2, garbage collector 151 scans L6 level segments 221-222 first by obtaining their respective fingerprints from namespace 201 via directory manager 202 or from a content store (not shown).

Figure 3:
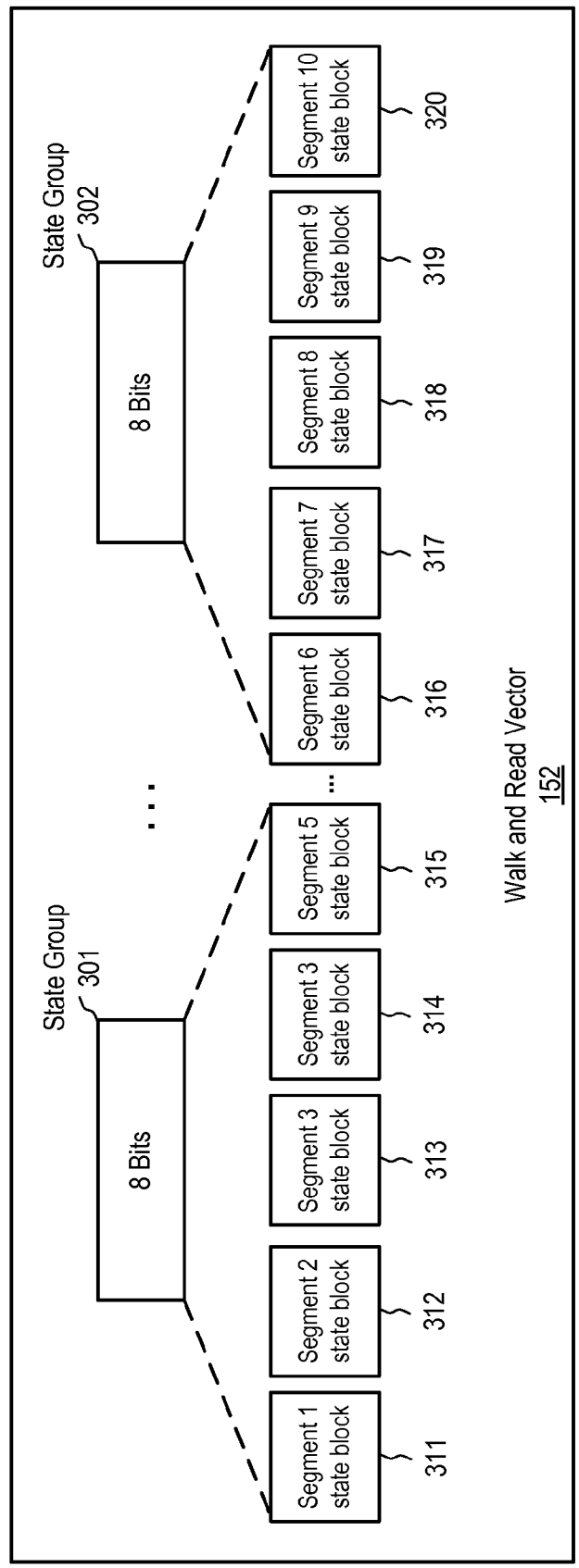
FIG. 3 is a block diagram illustrating a walk and read vector according to one embodiment of the invention.

Based on the fingerprints of the segments 221-222, corresponding segment state blocks in walk and read vector 152 are set to a predetermined state value to indicate that the walk operation has been performed on the corresponding segments. FIG. 3 illustrates walk and read vector 152 according to one embodiment. In the illustrated embodiment, walk and read vector 152 is logically partitioned into a plurality of state groups, e.g., state groups 301-302. Although two state groups are shown, more or less state groups can be included as part of walk and read vector 152 without departing from the broader scope and spirit of the present invention. In one embodiment, each of state groups 301-302 is logically partitioned into a plurality of segment state blocks. In the illustrated example, state group 301 is partitioned into segment state blocks 311-315, and state group 302 is partitioned into segment state blocks 316-320.

In one embodiment, each of segment state blocks 311-320 contains a state value, which indicates the current state of a segment. For example, segment state block 311 contains the current state of segment 1, segment state block 312 contains the current state of segment 2, and so on. In one embodiment, each segment can be in one of the following states: not walked nor read, walked but not read, walked and read. These states are discussed in further details below.

Conventionally, the state of each segment is represented two vectors: a walk vector and a read vector. The conventional walk vector includes a bit for each segment to be traversed during a garbage collection process. Similarly, the conventional read vector includes a bit for each segment to be traversed during the garbage collection process. For each segment that has been walked, a corresponding bit in the conventional walk vector is set to a predetermined logical value (e.g., 1). Likewise, for each segment that has been read, a corresponding bit in the conventional read vector is set to a predetermined value (e.g., 1). Thus, conventionally it requires two bits to represent the three states of each segment. For each garbage collection process/cycle, a fixed amount of memory is allocated for these vectors. The allocated memory imposes a maximum number of segments that can be cleaned in a single garbage collection process. For a system with limited memory, it may require multiple garbage collection processes/cycles to clean all the segments in the system. This could drastically slow down the garbage collection process. The walk and read vector of the present invention overcomes this limitation by reducing the number of bits required to represent the states of the segments.

According to one embodiment, each of state groups 301-302 includes eight bits. Conventionally, this would only allow the states of four segments to be represented. In one embodiment of the present invention, however, each 8-bit state group can represent the states of five segments, thus, increasing memory usage by 20%. Although each of state groups 301-302 is shown as having eight bits, it shall be appreciated the techniques of the present invention can be extended to state groups having more or less bits. Of course, a state group with fewer bits will represent fewer segments. The average number of bits required to represent a segment, however, will be less than two bits. Throughout the description, techniques are described for maintaining three different states for each segment. One having ordinary skill in the art, however, would recognize that the techniques can be extended to maintain more or less states for each segment, for example, by varying the number of bits in a state group and/or varying the number of segment state blocks that are represented by each state group.

Referring now back to FIG. 2, the segment state block to be updated for a particular segment can be determined by applying the fingerprint of the segment to collision-free hash function 211, such as a perfect hash function. A checksum is calculated for each of the fingerprints of L6 segments 221-222 and added to a parent checksum (P-checksum) associated with the L6 level (e.g., a current level as a parent level) as part of checksums/counters 215. In addition, a parent counter (P-counter) associated with the L6 level is incremented based on the number of L6 segments found in namespace 201. As described above, these operations (i.e., calculating the checksums, updating the P-checksum, and updating the P-counter) are collectively referred to as a "walk operation".

In one embodiment, prior to performing a walk operation on a segment, the corresponding segment state block is examined to determine whether the corresponding segment state block has been previously updated (i.e., to determine whether the walk operation has been previously performed on the segment). For example, if the segment state block contains a "walked but not read" or "walked and read" state value, then the segment has been previously walked. If segment state block indicates the walk operation has been previously performed, the above operations such as checksum calculation and P-counter update will be skipped, such that each segment will be processed only once.

After the P-checksum and P-counter of the L6 level have been populated, according to one embodiment, the read operation can performed on L6 segments 211-222. As part of the read operation, processing logic reads the fingerprints of L6 segments 211-222 from storage 205. As part of the read operations, checksums are calculated based on the retrieved fingerprints and added to a child checksum (C-checksum) of the L6 level. Further, a child counter (C-counter) of the L6 level is incremented, and the segment state blocks corresponding to L6 segments 211-222 in walk and read vector 152 are updated to indicate that the walk and read operations have been performed on these segments. In one embodiment, prior to performing the read operation, processing logic determines whether the segment has been previously walked (e.g., as indicated by the corresponding segment state block in walk and read vector 152 containing a "walked but not read" state value). If the walk operation has not been performed, the read operation for the corresponding segment will not be performed (e.g., calculating checksum, adding to C-checksum, and incrementing C-counter will be skipped). As described above, for each segment, the walk and read operation can be performed once. Accordingly, if the segment state block contains the state "walked and read", indicating that the segment has been previously read, the read operation will also be skipped for the corresponding segment.

After the metadata of L6 segments 221-222 have been processed, according to one embodiment, the actual data portions of the L6 segments 221-222 are read from storage 205 to identify their respective child segments and to obtain fingerprints of their child segments, in this example, L5 segments 231-233. Now the child level, i.e., L5 level, becomes the current level and the above processes are iteratively performed to populate checksums/counters 215 and walk and read vector 152. After all segments of all levels have been processed, processing logic may compare the P-checksum with the C-checksum for each level and compare the P-counter with the C-counter for each level to determine whether they all match. If they do not match there is a possibility of data corruption. Otherwise, the garbage collection may then be performed if they all match.

In one embodiment, collision-free hash function 211 is a perfect hash function. A perfect hash function for a set S is a hash function that maps distinct elements in S to a set of integers, with no collisions. A perfect hash function has many of the same applications as other hash functions, but with the advantage that no collision resolution scheme has to be implemented.

In one embodiment, collision-free hash function 211, such as a perfect hash function, is generated based on the fingerprints of the segments (e.g., a set of fingerprints) stored in the storage system prior to performing the traversal of the namespace 201. That is, prior to performing any garbage collection, a processing logic such as garbage collector 151 scans all fingerprints of the segments that are involved in the garbage collection to generate a collision-free hash function for those involved segments. If the garbage collection is performed based on a subset of segments (e.g., a range of fingerprints), for each subset, a corresponding collision-free hash function may be specifically generated based on the fingerprints of the segments involved in that particular subset.

According to one embodiment, processing logic such as garbage collector 151 walks through, via directory manager 202, the root level or the most parent level segments, in this example, the L6 segments 221-222 and all the L6 references are added to walk and read vector 152. The root segments 221-222 may be identified based on their content handles, which may be maintained by namespace 201 or the content store (not shown). Based on the content handles, the references (e.g., fingerprints) associated with segments 221-222 may be obtained. Thereafter, the processing logic performs a level-by-level scan of a set of containers that are involved in the garbage collection, which may be a subset of containers or all containers. During the scan for a given level $L_i$ ($1 \le i \le$ number of levels, in this example, 6), only containers that contain segments of the L level are considered. Once a container having $L_i$ segments is found, processing logic reads the content (e.g., metadata and/or data portion) of the container or compression regions containing the $L_i$ segments, checks walk and read vector 152 of all the $L_i$ segments and if any is found, adds their references or $L_{i-1}$ segments to walk and read vector 152. The processing logic scans the $L_1$ level only if the $L_i$ level has been fully processed. In this example, referring back to FIG. 2, the processing logic will scan segments 221-222 and populates walk and read vector 152 before scanning their next child level segments 231-233, and so on.

Figure 4:
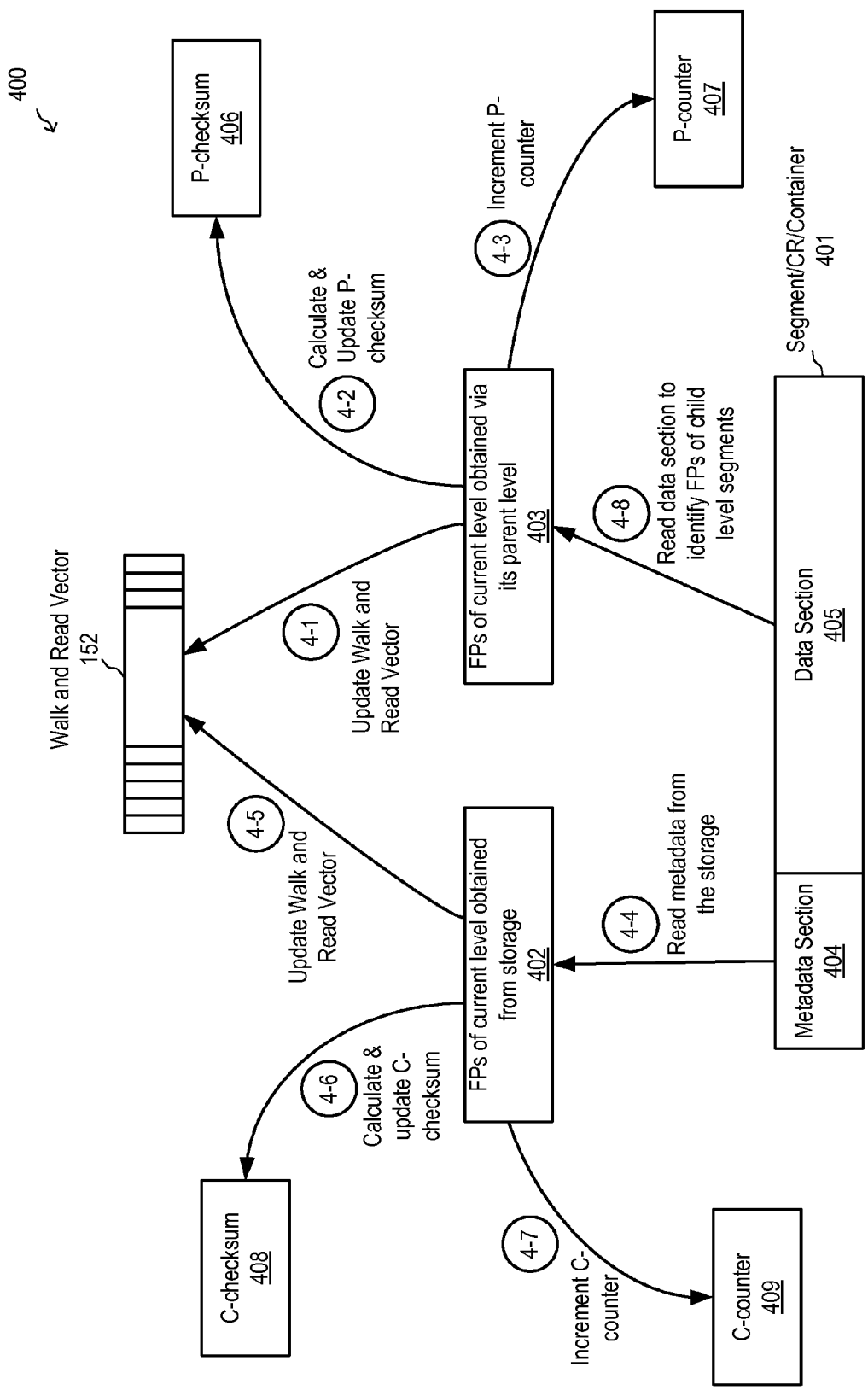
FIG. 4 is a block diagram illustrating a processing flow of traversing a namespace of a file system for verifying data integrity according to one embodiment of the invention.

FIG. 4 is a block diagram illustrating a processing flow of traversing a namespace of a file system for verifying data integrity according to one embodiment of the invention. For example, process 400 may be performed by a system as shown in FIG. 2. The following description of process 400 assumes that walk and read vector 152 includes state groups that are each 8-bit wide, and that each state group includes five segment state blocks, each segment state block representing the state of a segment/fingerprint. The description further assumes that each segment state block can represent up to three states for each segment/fingerprint. These assumptions are made for the sake of clarity in describing process 400, and not intended to be limitations of the present invention.

Referring to FIG. 4, at transaction 4-1, a perfect hash function is applied to fingerprint 403 of a current level segment that are obtained from the parent level. If the current level is the root level (e.g., L6 level), fingerprint 403 of the current level segment may be obtained via its content handle, which may be maintained by the directory manager/namespace and/or the content store. The perfect hash function produces an index for the fingerprint. For example:

$$x = phf(fp) \quad \text{(Equation 1)}$$

where x is the index, phf is a collision-free hash function, and fp is the fingerprint of the segment. For this example, we will assume that x is 7. As part of transaction 4-1, processing logic determines which state group within walk and read vector 152 contains the state for fingerprint fp by applying the following equation:

$$sg = x/\text{seg\_per group} \quad \text{(Equation 2)}$$

where sg is the state group, and seg_per group is the number of segments represented in a group. For the purpose of illustration, in this example, it is assumed five (5) segments are compressed within a group. Thus, for this example, sg=7/5=1, indicating the second state group (e.g., state group 301) in walk and read vector 152 contains the state for fingerprint fp. Next, processing logic determines which segment state block within the located second state group contains the state for fingerprint fp, by applying the following equation:

$$ssb = x \bmod \text{seg\_per group} \quad \text{(Equation 3)}$$

where ssb is the segment state block within the located second state group which contains the state for fingerprint fp. In this example, ssb=7 modulo 5=2, indicating the third segment state block (e.g., segment state block 312) in second state group contains the state for fingerprint fp.

In one embodiment, prior to performing the walk operation, processing logic determines if the walk operation has been previously performed for the segment, by examining the current state value contained at the third segment state block. To determine the current state of fingerprint fp, processing logic obtains the group value of the located second state group. For example, assuming each state group includes eight bits, then the group value can be within the range of 0-255.

The processing logic determines the current state of fingerprint fp by applying the following equation:

$$y = \text{uncompress\_lookup\_table}[x \bmod \text{seg\_per group}]\\ [gv] \quad \text{(Equation 4)}$$

where y is the current state value, gv is the group value, and uncompress_lookup_table is defined below. In one embodiment, y can be within the range of 0-2 (e.g., 3 states), where 0 means the segment corresponding to fingerprint fp is in the state of "not walked nor read", 1 means "walked, but not read", and 2 means "walked and read". According to one embodiment, uncompress_lookup_table is pre-computed using the following equation:

$$\text{uncompress\_lookup\_table}[i][j] = (1/\text{pow3\_table}[i])\\ \text{modulo states\_per\_seg} \quad \text{(Equation 5)}$$

where i is in the range of [0,4] (representing number of segments in a group), j is in the range of [0,255] (e.g., a range of values represented by a byte), states_per seg is the number of states represented by each segment, and lookup table pow3_table is defined as:

$$\text{pow3\_table} = [1,3,9,27,81] \quad \text{(Equation 6)}$$

In this example, there are three states and five segments compressed in a group. If there are ten segments in a group, the lookup table above will have ten values. If y is non-zero, indicating the fingerprint fp has been walked, the processing logic will move onto the next fingerprint of the current level. Assuming y=0, indicating fingerprint fp has not been walked nor read, as part of transaction 4-1, processing logic updates the second state group to indicate the fingerprint fp has been walked, by applying the following equation:

$$gv \mathrel{+}= (\text{new\_state} - \text{old\_state}) * \text{pow3\_table}[x \bmod\\ \text{seg\_per\_group}] \quad \text{(Equation 7)}$$

where new_state is the value of the new state, old_value is the value of the old/current state. In this example, old_state=0 ("not walked nor read") and new_state=1 ("walked, but not read"). Thus, the group value is modified by adding the old/current group value with pow3_table[2]. In other words, new group value=old/current group value+9. The new group value is then written back to the second state group to indicate that fingerprint fp has now been "walked, but not read". In one embodiment, the new group value only affects the state of fingerprint fp, and not any other fingerprint represented by second state group. The above operations of transaction 4-1 are performed iteratively for all fingerprints of the current level obtained via their parent level.

At transaction 4-2, based on fingerprints 403 of the current level, a checksum is calculated and added to P-checksum 406 associated with the current level. In one embodiment, the new checksum may be added to P-checksum 406 via a logical operation such as an exclusive OR (XOR) operation. At transaction 4-3, P-counter 407 associated with the current level is incremented based on the number of unique current level segments. Based on fingerprint 403 of a current level segment, their storage location such as container 401 is identified. Fingerprint 402 of the current level segment is then read from metadata 404 of identified container 401.

At transaction 4-5, the processing logic determines if the read operation has been performed on fingerprint 402 of the current level obtained from storage by examining the state value of the corresponding segment state block of walk and read vector 152. For example, the processing logic applies equations similar to Equations 1-6 to determine the current state y. In one embodiment, if the segment state block indicates the segment has been "walked, but not read", the read operation is performed on the segment (e.g., through transactions 4-6 and 4-7, described below). In one embodiment, the read operation is performed only if the walk operation has been previously performed on the segment. Thus, if the corresponding segment state block indicates the fingerprint is in the state "not walked nor read", the processing logic simply moves onto the next 402 fingerprint. In one embodiment, the read operation is performed once for each fingerprint of fingerprints 402. Thus, if the corresponding segment state block indicates the fingerprint is in the state of "walked and read", the processing logic will also move onto the next fingerprint of fingerprints 402. The operations of transaction 4-5 are iteratively performed for all fingerprints 402.

At transaction 4-6, a checksum is calculated for each of the fingerprints read from storage 401 and the newly calculated checksum is added (e.g., XORed) to C-checksum 408. At transaction 4-7, C-counter 409 is updated based on the number of unique current level segments read from storage 401. At transaction 4-8, data portion 405 of the segment is read from storage 401 to obtain fingerprint(s) of its child segment(s). Thereafter, the next child level becomes the current level and the above processes as shown in FIG. 4 are repeatedly performed, until all segments of all levels have been processed. Thereafter, the P-checksum and C-checksum of each level, as well we the P-counter and C-counter of each level, are examined to ensure that they match (e.g., no data corruption) before performing the garbage collection process.

Figure 5A:
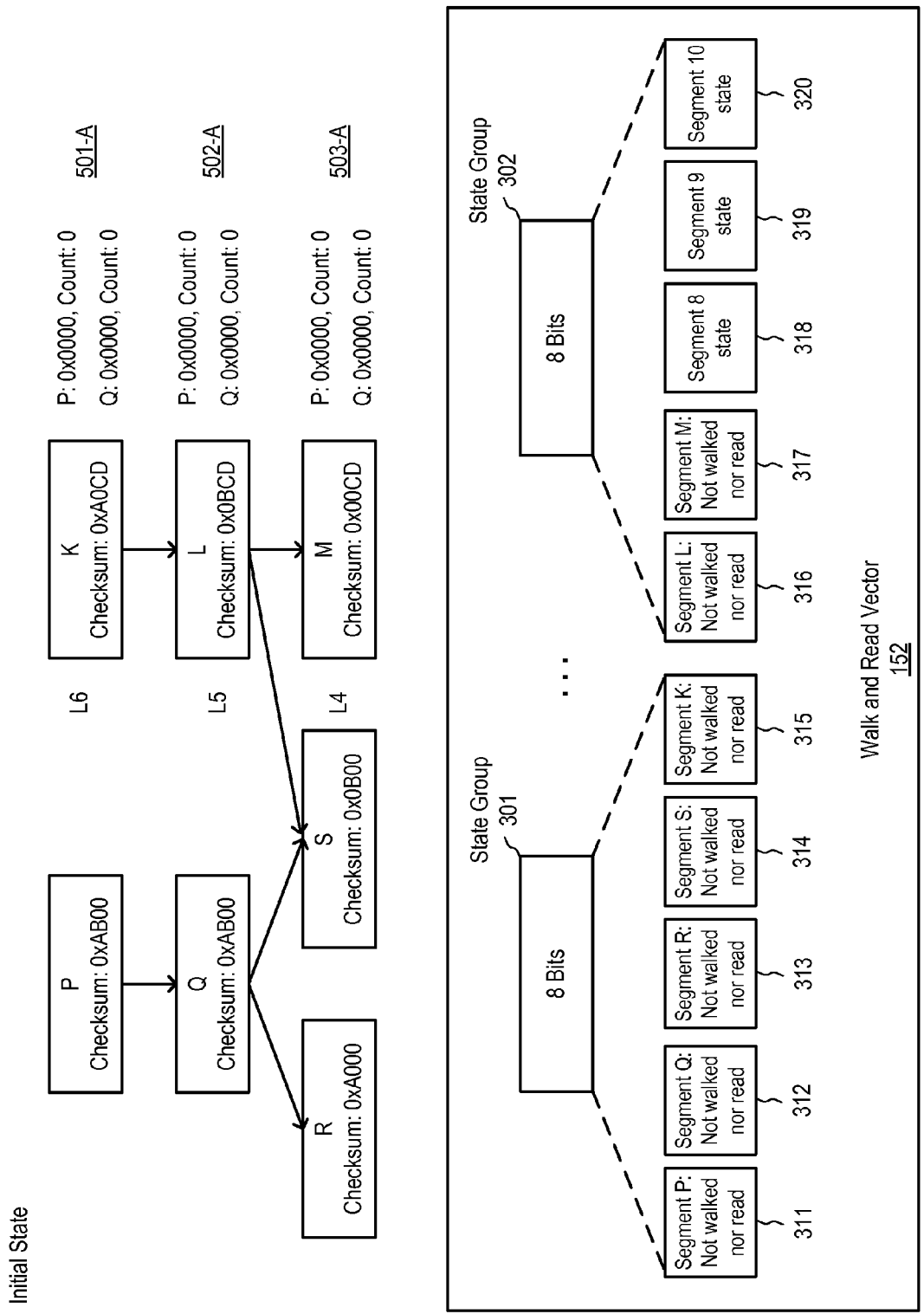
FIG. 5A is a diagram illustrating a processing of verifying data integrity of segments according to one embodiment of the invention.

FIGS. 5A-5E are diagrams illustrating a process of verifying data integrity of segments according to one embodiment of the invention. Referring now to FIG. 5A, in this example, the namespace includes L6 segments P and K, L5 segments Q and L, and L4 segments R, S, and M. For the purpose of illustration, each segment is shown with a checksum that is calculated from its fingerprint, which is obtained either from its parent or content handle or from the storage as described above. Initially, the P-checksum, C-checksum, P-counter, and C-counter of each level are empty or zero, as shown in blocks 501-A-503-A. In addition, walk and read vector 152 has been initialized such that all segments are in the state "not walked nor read". In this example, segment state blocks 311-317 contain the states of segments P, Q, R, S, K, L, and M, respectively.

Figure 5B:
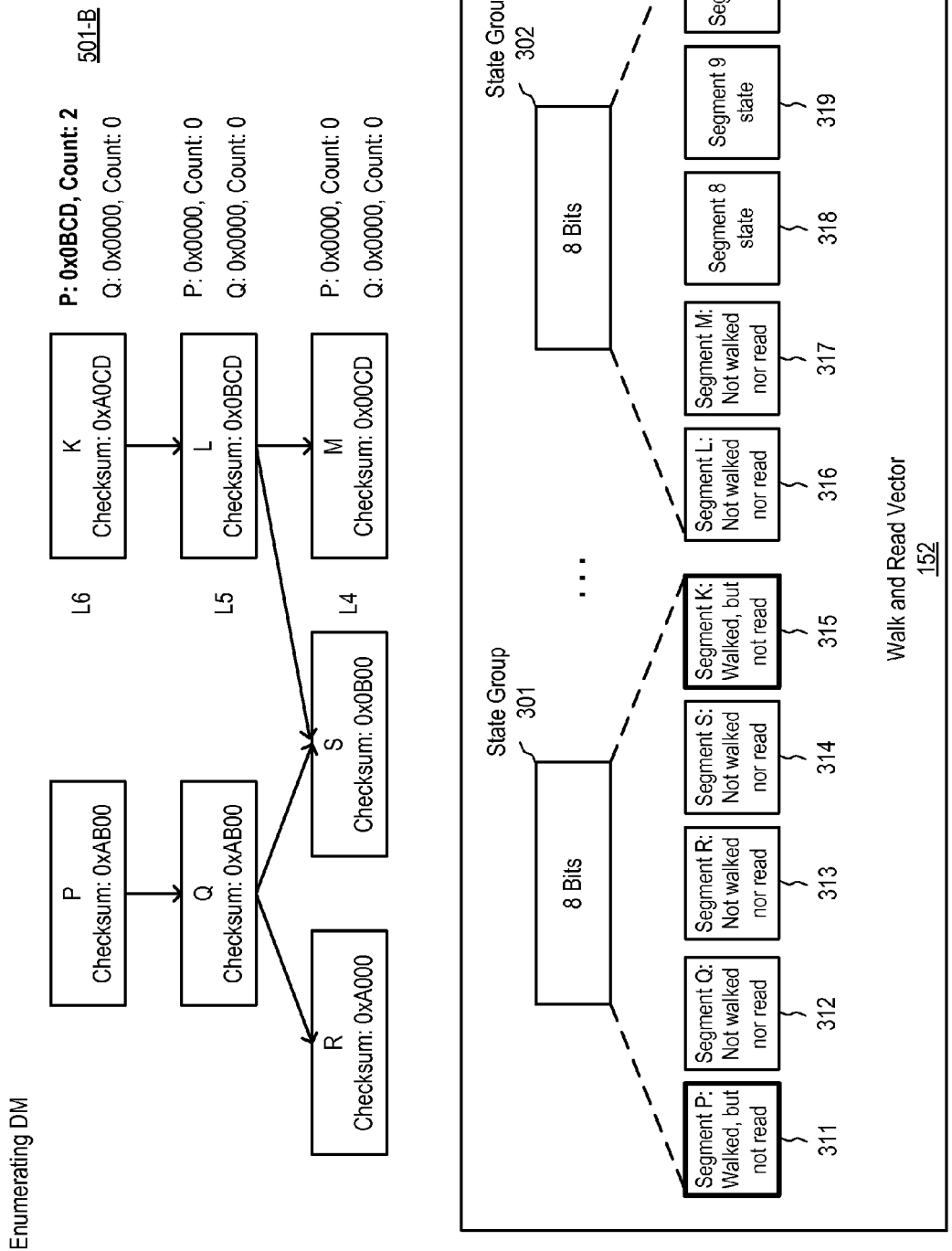
FIG. 5B is a diagram illustrating a processing of verifying data integrity of segments according to one embodiment of the invention.

Referring now to FIG. 5B, at block 501-B, the processing logic starts with L6 segments P and K by obtaining their fingerprints from their respective content handles. By applying equations similar to Equations 1-3, the processing logic determines that segment state blocks 311 and 315 of state group 301 represent segments P and K, respectively. Further, the processing logic determines that the walk operation has not been performed on segments P and K, for example, by applying equations similar to Equations 4-6. Thus, the checksum of the fingerprint for segment P is calculated, in this example, 0xAB00. Similarly, the checksum of the fingerprint for segment K is calculated, in this example, 0xA0CD. As part of the walk operation, both checksums are then added, in this example, XORed, to P-checksum (resulting in checksum 0x0BCD). Further, the associated P-counter is incremented by 2 because the walk operation was performed on two segments (P and K) of the current level. The processing logic updates state group 301 of walk and read vector 152 to indicate that segments P and K have been "walked, but not read", for example, by using an equation similar to Equation 7. Note that the update of state group 301 does not affect the state of the other segments (e.g., segments Q, R, S) that are represented by state group 301.

Figure 5C:
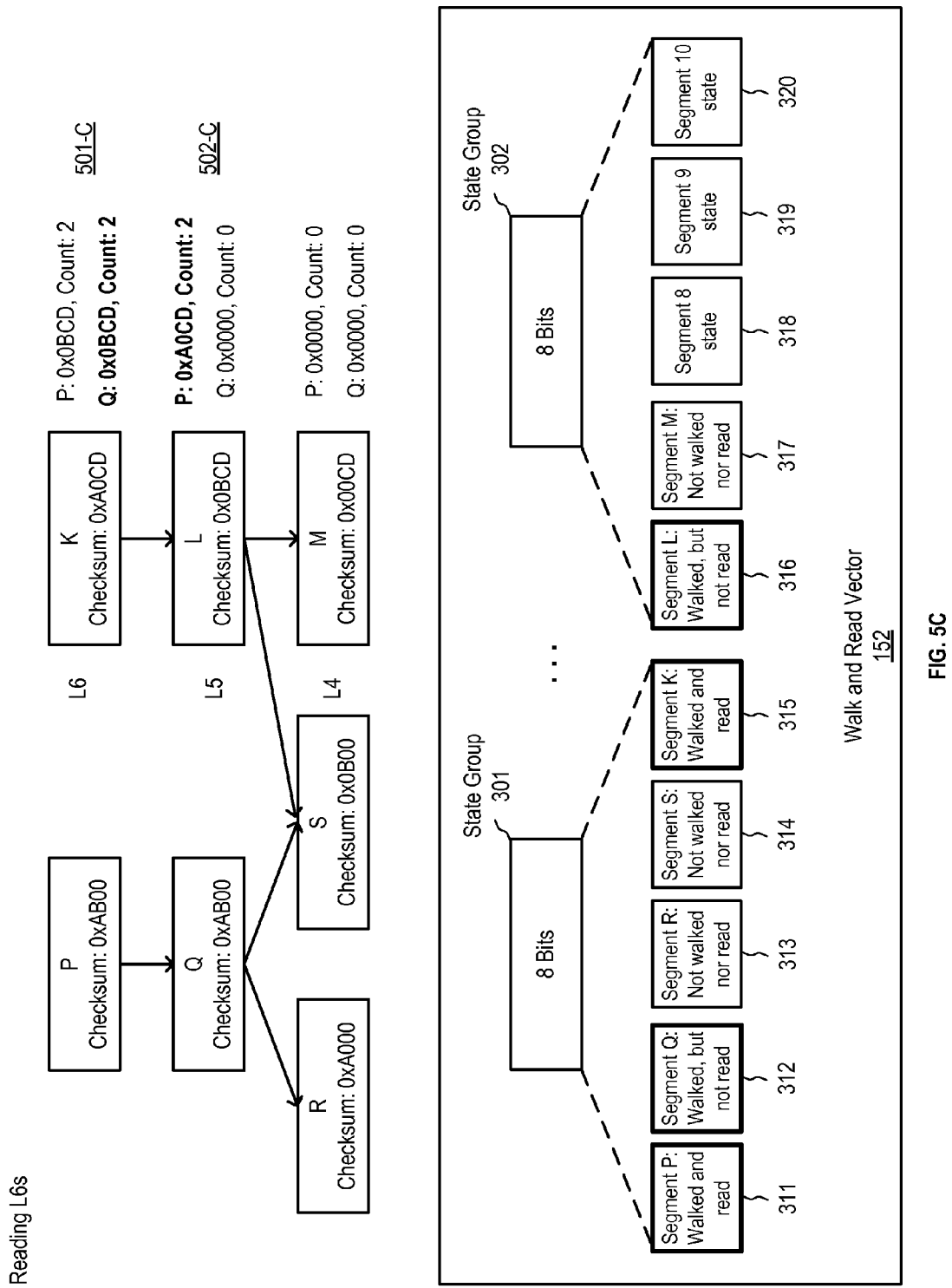
FIG. 5C is a diagram illustrating a processing of verifying data integrity of segments according to one embodiment of the invention.

Referring now to FIG. 5C, at block 501-C, from the fingerprints of segments P and K, their storage locations (e.g., containers) are identified, for example, via a fingerprint-to-storage index. The fingerprints of segments P and K are then retrieved from the storage. By applying equations similar to Equations 1-3, the processing logic determines that segment state blocks 311 and 315 of state group 301 represent segments P and K, respectively. Further, the processing logic determines that the read operation has not been performed on segments P and K, for example, by applying equations similar to Equations 4-6. Thus, the checksum of the retrieved fingerprints are calculated and added, in this example, XORed, to C-checksum (resulting in checksum 0x0BCD). Further, the associated C-counter is incremented by 2 because the read operation was performed on two segments (P and K) of the current level. The processing logic updates state group 301 of walk and read vector 152 to indicate that segments P and K have been "walked and read", for example, by using an equation similar to Equation 7.

At block 502-C, the data portions of segments P and K are then read from the storage to obtain fingerprints of their child segments Q and L. By applying equations similar to Equations 1-3, the processing logic determines that segments Q and L are represented by segment state block 312 of state group 301, and segment state block 316 of state group 2, respectively. Further, the processing logic determines that the walk operation has not been performed on segments Q and L, for example, by applying equations similar to Equations 4-6. Thus, the checksum of the fingerprint for segment Q is calculated, in this example, 0xAB00. Similarly, the checksum of the fingerprint for segment L is calculated, in this example, 0x0BCD. As part of the walk operation, both checksums are then added, in this example, XORed, to P-checksum (resulting in checksum 0xA0CD). Further, the associated P-counter is incremented by 2 because the walk operation was performed on two segments (Q and L) of the current level. The processing logic updates state groups 301-302 of walk and read vector 152 to indicate that segments Q and L have been "walked, but not read", for example, by using an equation similar to Equation 7.

Figure 5D:
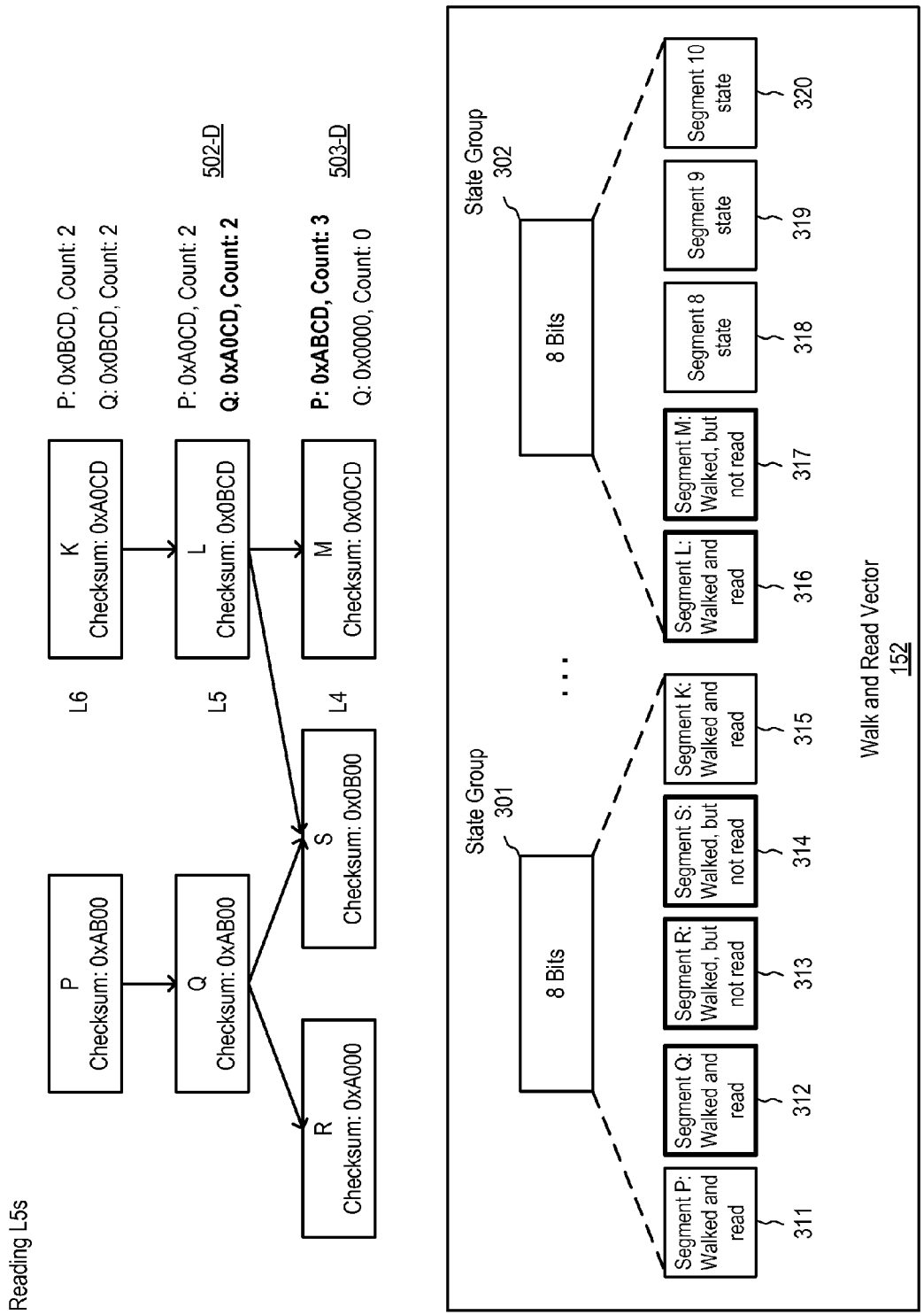
FIG. 5D is a diagram illustrating a processing of verifying data integrity of segments according to one embodiment of the invention.

Referring now to FIG. 5D. At block 502-D, from the fingerprints of segments Q and L, their storage locations (e.g., containers) are identified, for example, via a fingerprint-to-storage index. The fingerprints of segments Q and L are then retrieved from the storage. By applying equations similar to Equations 1-3, the processing logic determines that segments Q and L are represented by segment state block 312 of state group 301 and segment state block 316 of state group 302, respectively. Further, the processing logic determines that the read operation has not been performed on segments Q and L, for example, by applying equations similar to Equations 4-6. Thus, the checksum of the retrieved fingerprints are calculated and added, in this example, XORed, to C-checksum (resulting in checksum 0xA0CD). Further, the associated C-counter is incremented by 2 because the read operation was performed on two segments (Q and L) of the current level. The processing logic updates state groups 301-302 of walk and read vector 152 to indicate that segments Q and L have been "walked and read", for example, by using an equation similar to Equation 7.

At block 503-D, the data portions of segments Q and L are then read from the storage to obtain fingerprints of their child segments R, S, and M. By applying equations similar to Equations 1-3, the processing logic determines that segments R, S, and M are represented by segment state blocks 313-314 of state group 301, and segment state block 317 of state group 2, respectively. Further, the processing logic determines that the walk operation has not been performed on segments R, S, and M, for example, by applying equations similar to Equations 4-6. Thus, the checksum of the fingerprint for segment R is calculated, in this example, 0xA000. Similarly, the checksum of the fingerprint for segment S is calculated, in this example, 0x0B00. Further, the checksum of the fingerprint for segment M is calculated, in this example, 0x00CD. As part of the walk operation, the checksums are then added, in this example, XORed, to P-checksum (resulting in checksum 0xABCD). Further, the associated P-counter is incremented by 3 because the walk operation was performed on three segments (R, S, and M) of the current level. The processing logic updates state groups 301-302 of walk and read vector 152 to indicate that segments R, S, and M have been "walked, but not read", for example, by using an equation similar to Equation 7.

Figure 5E:
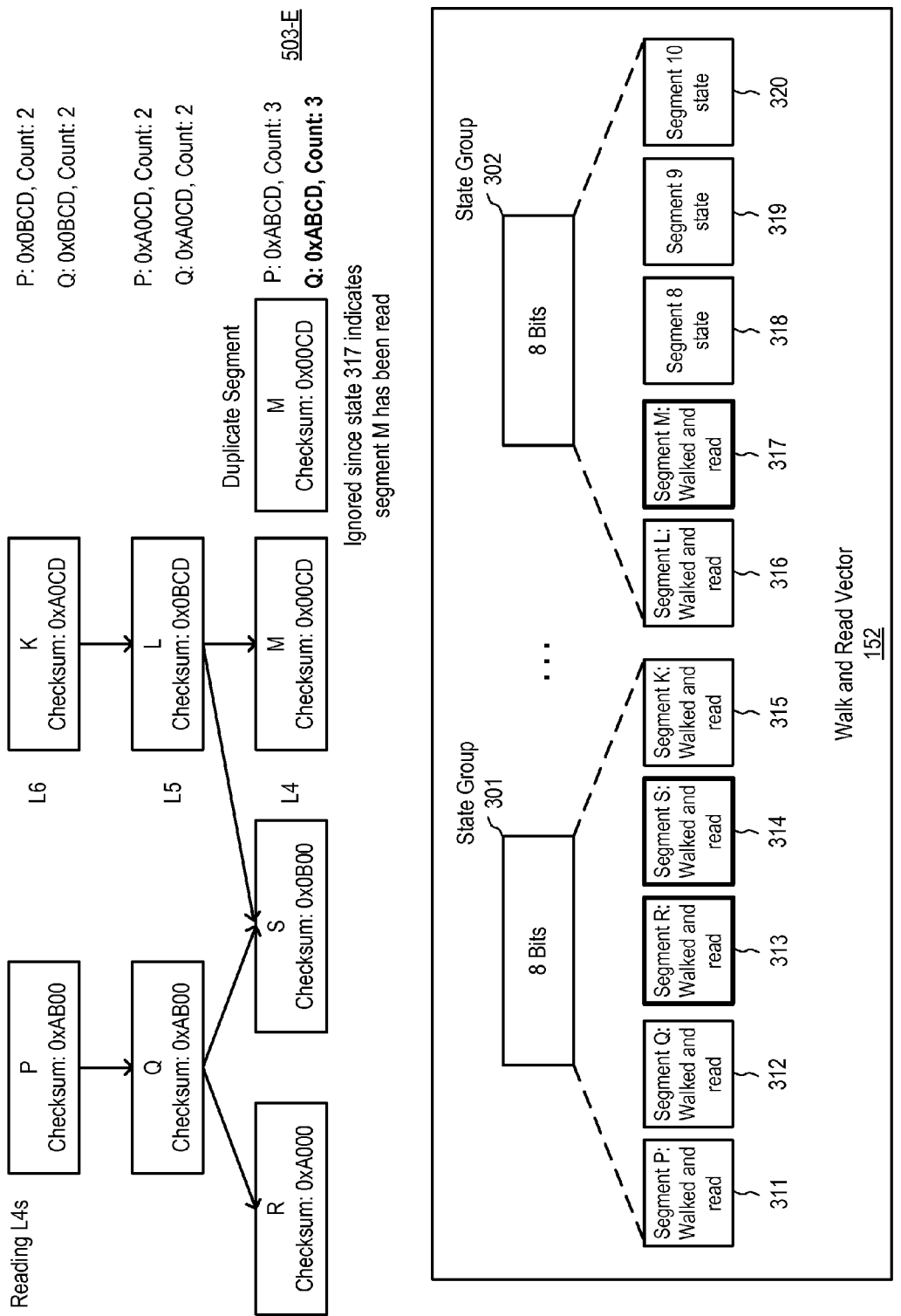
FIG. 5E is a diagram illustrating a processing of verifying data integrity of segments according to one embodiment of the invention.

Referring now to FIG. 5E. At block 503-E, from the fingerprints of segments R, S, and M, their storage locations (e.g., containers) are identified, for example, via a fingerprint-to-storage index. The fingerprints of segments R, S, and M are then retrieved from the storage. By applying equations similar to Equations 1-3, the processing logic determines that segments R, S, and M are represented by segment state blocks 313-314 of state group 301 and segment state block 317 of state group 302, respectively. Further, the processing logic determines that the read operation has not been performed on segments R, S, and M, for example, by applying equations similar to Equations 4-6. Thus, the checksum of the retrieved fingerprints are calculated and added, in this example, XORed, to C-checksum (resulting in checksum 0xABCD). Further, the associated C-counter is incremented by 3 because the read operation was performed on three segments (R, S, and M) of the current level. The processing logic updates state groups 301-302 of walk and read vector 152 to indicate that segments R, S, and M have been "walked and read", for example, by using an equation similar to Equation 7.

Assuming there is a duplicated segment M in the namespace and/or storage, since walk and read vector 152 is examined to ensure that there is no prior processing for the same segment, the duplicated segment will be ignored herein. For example, the processing logic determines that segment M is represented by segment state block 317, which contains the state value "walked and read", indicating that segment M has been previously processed. As a result, the processing logic skips the walk and read operation for segment M. Thereafter, the P-checksums and C-checksums, as well as the P-counter and C-counter, of each level are compared to determine if they match. If they do not match, it means that there may be data corruption and the garbage collection may not be performed. In this example, the processing logic determines that the walk and read operations have been successfully performed on all segments. For example, the process logic determines that the segment state blocks of all segments have reached a predetermined state (e.g., "walked and read"), and that all checksums and counters of all levels match. In response to determining the walk and read operations are successful, the processing logic performs garbage collection.

Figure 6:
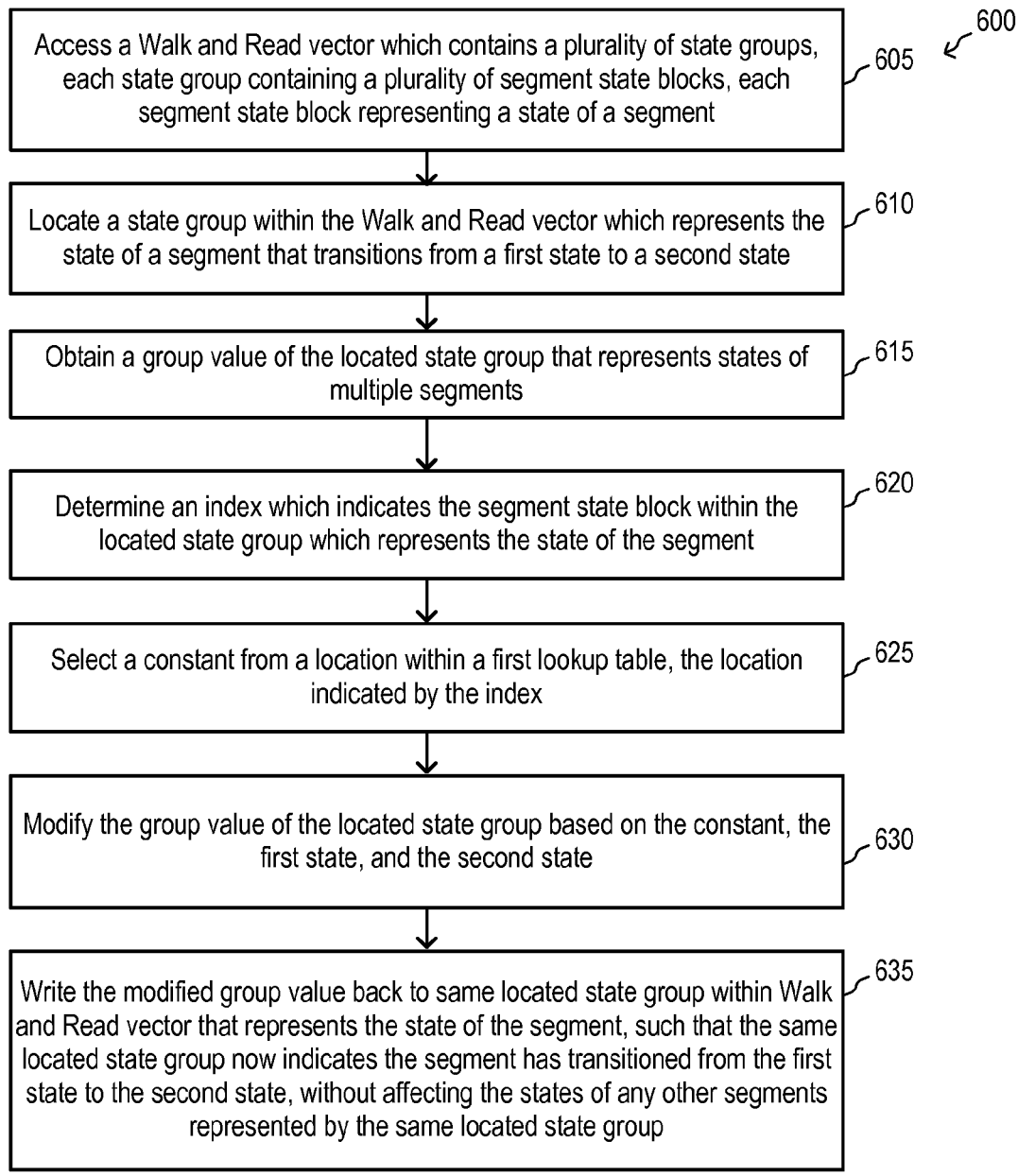
FIG. 6 is a flow diagram illustrating a method for verifying data integrity of segments according to one embodiment.

FIG. 6 is a flow diagram illustrating method 600 for determining data integrity for garbage collection according to one embodiment. For example, method 600 can be performed by garbage collector 151, which can be implemented in software, firmware, hardware, or any combination thereof. Referring now to FIG. 6, at block 605, the garbage collector accesses a walk and read vector (e.g., walk and read vector 152) as part of transaction 4-1. In one embodiment, the walk and read vector contains a plurality of state groups (e.g., state groups 301-302), each state group containing a plurality of segment state blocks (e.g., segment state blocks 311-320), each segment state block representing a state of a segment.

At block 610, the garbage collector locates the state group within the walk and read vector which represents the state of a segment that transitions from a first state to a second state (e.g., applying equations similar to Equations 1-2). At block 615, the garbage collector obtains a group value of the located state group that represents states of multiple segments (e.g., as part of transaction 4-1). At block 620, the garbage collector determines an index, which indicates the segment state block within the located state group, which represents the state of the segment (e.g., by applying an equation similar to Equation 3).

At block 625, the garbage collector selects a constant from a location within a first lookup table (e.g., pow3_table), the location indicated by the index. At block 630, the garbage collector modifies the group value of the located state group based on the constant, the first state, and the second state (e.g., by applying an equation similar to Equation 7).

At block 635, the garbage collector writes the modified group value back to same located state group within walk and read vector that represents the state of the segment, such that the same located state group now indicates the segment has transitioned from the first state to the second state, without affecting the states of any other segments represented by the same located state group.

Figure 7:
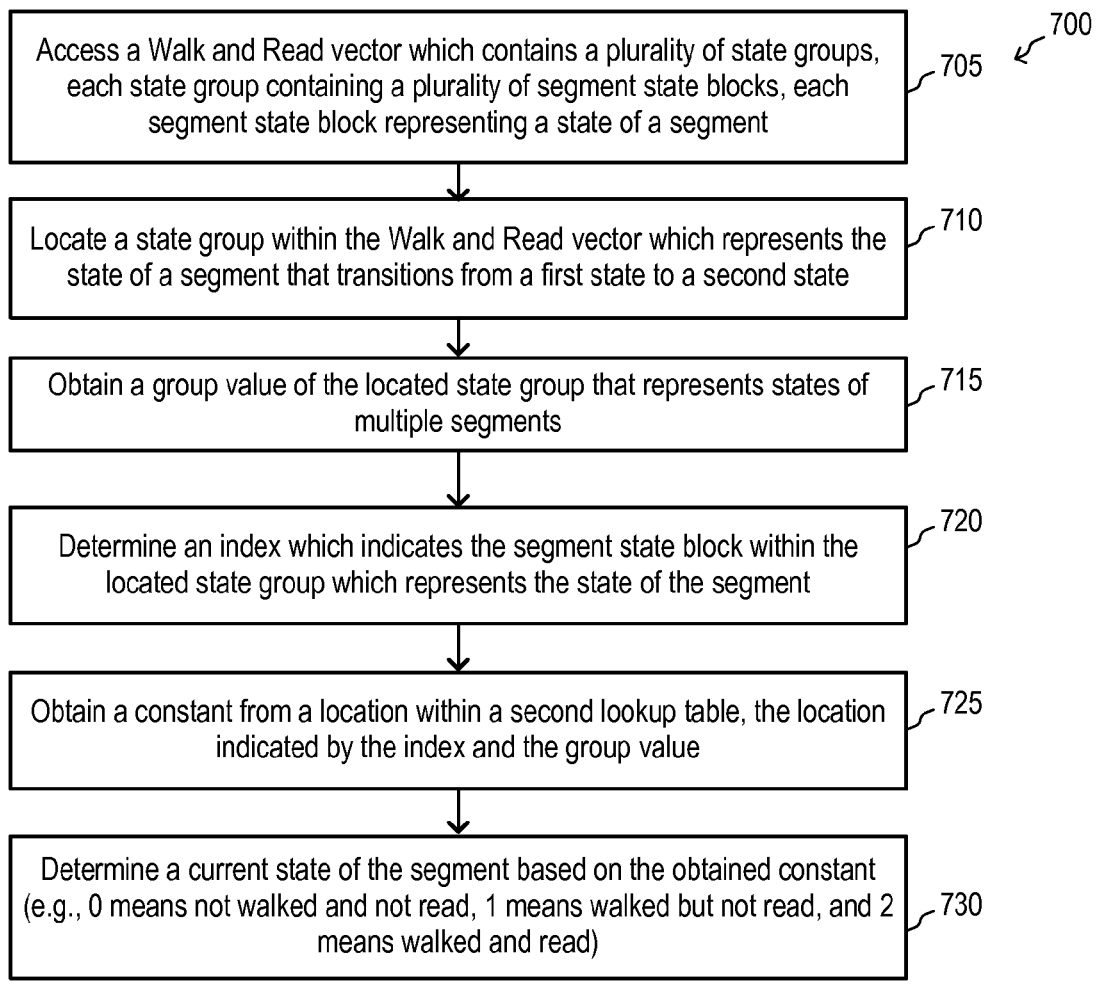
FIG. 7 is a flow diagram illustrating a method for verifying data integrity of segments according to one embodiment.

FIG. 7 is a flow diagram illustrating method 700 for determining data integrity for garbage collection according to one embodiment. For example, method 700 can be performed by garbage collector 151, which can be implemented in software, firmware, hardware, or any combination thereof. Referring now to FIG. 7, at block 705, the garbage collector accesses a walk and read vector (e.g., walk and read vector 152) as part of transaction 4-1. In one embodiment, the walk and read vector contains a plurality of state groups (e.g., state groups 301-302), each state group containing a plurality of segment state blocks (e.g., segment state blocks 311-320), each segment state block representing a state of a segment.

At block 710, the garbage collector locates the state group within the walk and read vector which represents the state of a segment that transitions from a first state to a second state (e.g., applying equations similar to Equations 1-2). At block 715, the garbage collector obtains a group value of the located state group that represents states of multiple segments (e.g., as part of transaction 4-1). At block 720, the garbage collector determines an index, which indicates the segment state block within the located state group, which represents the state of the segment (e.g., by applying an equation similar to Equation 3).

At block 725, the garbage collector obtains a constant from a location within a second lookup table (e.g., uncompress_lookup_table), the location indicated by the index and the group value (e.g., by applying an equation similar to Equation 4). At block 730, the garbage collector determines a current state of the segment based on the obtained constant (e.g., 0 means not walked and not read, 1 means walked but not read, and 2 means walked and read).

Figure 8:
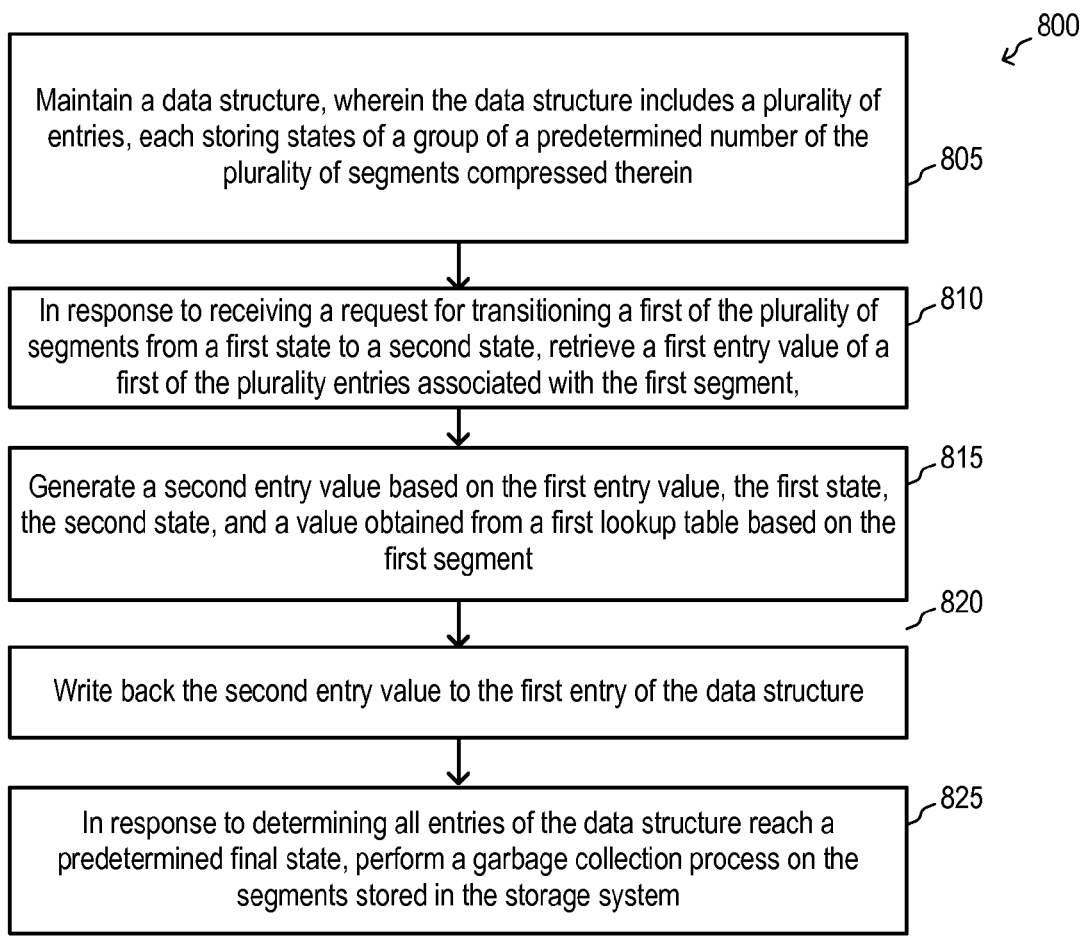
FIG. 8 is a flow diagram illustrating a method for verifying data integrity of segments according to one embodiment.

FIG. 8 is a flow diagram illustrating method 800 for determining data integrity for garbage collection according to one embodiment. For example, method 800 can be performed by garbage collector 151, which can be implemented in software, firmware, hardware, or any combination thereof. Referring now to FIG. 8, at block 805, the garbage collector maintains a data structure (e.g., walk and read vector 152), wherein the data structure includes a plurality of entries (e.g., state groups 301-302), each storing states (e.g., "not walked nor read", walked, but not read", "walked and read") of a group of a predetermined number of the plurality of segments compressed therein.

At block 810, in response to receiving a request for transitioning a first of the plurality of segments from a first state to a second state (e.g., "not walked nor read" to "walked, but not read", or "walked, but not read" to "walked and read"), retrieve a first entry value (e.g., group value) of a first of the plurality entries associated with the first segment.

At block 815, the garbage collector generates a second entry value based on the first entry value, the first state, the second state, and a value obtained from a first lookup table based on the first segment (e.g., by applying an equation similar to Equation 7). At block 820, the garbage collector writes back the second entry value to the first entry of the data structure. At block 825, the garbage collector, in response to determining all entries of the data structure reach a predetermined final state (e.g., "walked and read"), performs a garbage collection process on the segments stored in the storage system.

Figure 9:
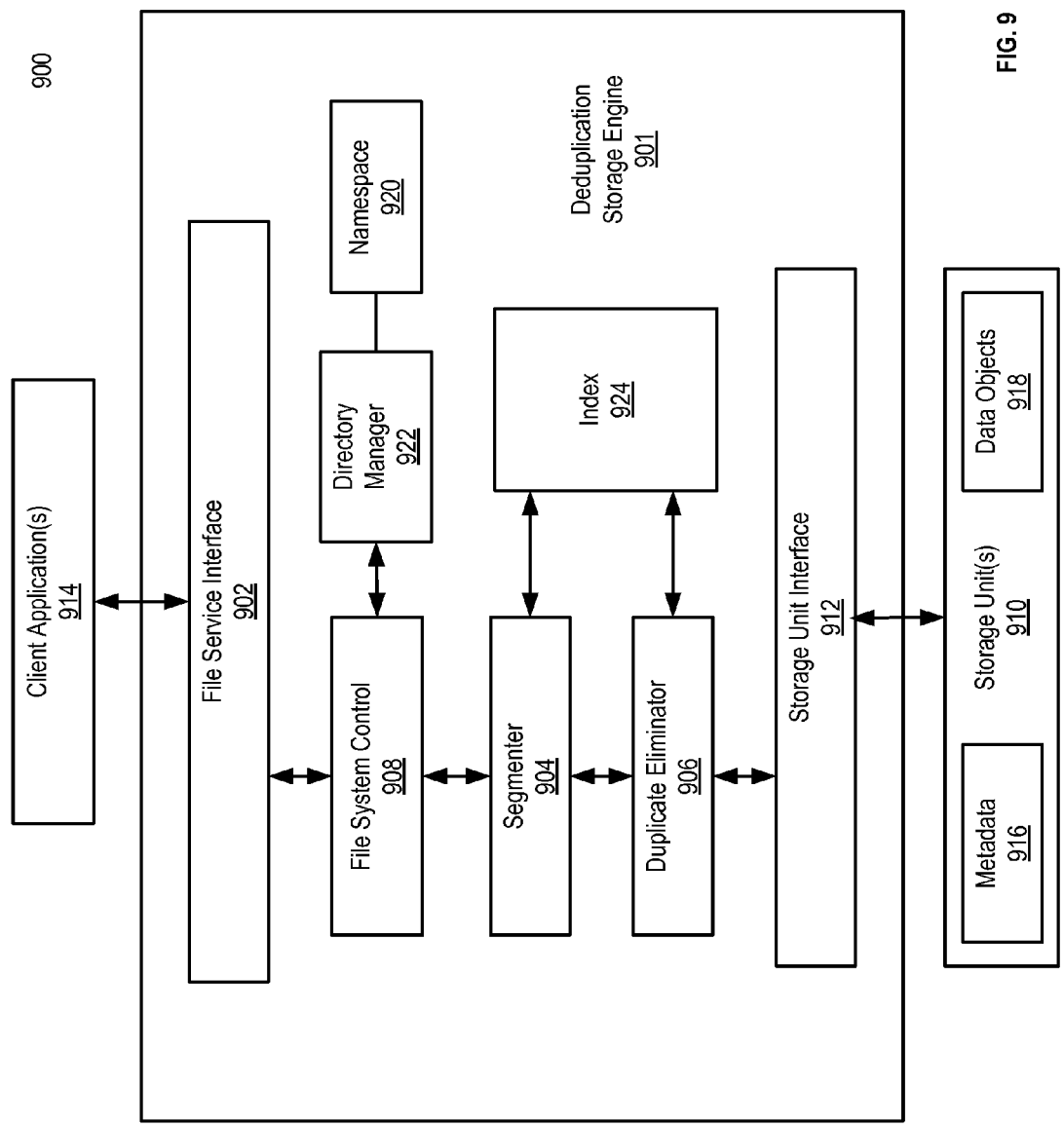
FIG. 9 is a block diagram illustrating a deduplicated storage system according to one embodiment of the invention.

FIG. 9 is a block diagram illustrating a deduplication storage system according to one embodiment of the invention. For example, deduplication storage system 900 may be implemented as part of a deduplication storage system as described above, such as, for example, the deduplication storage system as shown in FIG. 1. In one embodiment, storage system 900 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 900 may have a distributed architecture, or all of its components may be integrated into a single unit. Storage system 900 may be implemented as part of an archive and/or backup system such as a deduplicating storage system available from EMC® Corporation of Hopkinton, Mass.

In one embodiment, storage system 900 includes a deduplication engine 901 interfacing one or more clients 914 with one or more storage units 910 storing metadata 916 and data objects 918. Clients 914 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 910 may be implemented locally (e.g., single node operating environment) or remotely (e.g., multi-node operating environment) via an interconnect, which may be a bus and/or a network. In one embodiment, one of storage units 910 operates as an active storage to receive and store external or fresh user data, while the another one of storage units 910 operates as a target storage unit to periodically archive data from the active storage unit according to an archiving policy or scheme. Storage units 910 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 910 may also be combinations of such devices. In the case of disk storage media, the storage units 910 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 916, may be stored in at least some of storage units 910, such that files can be accessed independent of another storage unit. Metadata of each storage unit includes enough information to provide access to the files it contains. In one embodiment, metadata may include fingerprints contained within data objects 918, where a data object may represent a data segment, a compression region (CR) of data segments, or a container of one or more CRs. Fingerprints are mapped to a particular data object via metadata 916, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 901 includes file service interface 902, segmenter 904, duplicate eliminator 906, file system control 908, and storage unit interface 912. Deduplication storage engine 901 receives a file or files (or data item(s)) via file service interface 902, which may be part of a file system namespace 920 of a file system associated with the deduplication storage engine 901. The file system namespace 920 refers to the way files are identified and organized in the system. An example is to organize the files hierarchically into directories or folders, which may be managed by directory manager 922. File service interface 912 supports a variety of protocols, including a network file system (NFS), a common Internet file system (CIFS), and a virtual tape library interface (VTL), etc.

The file(s) is/are processed by segmenter 904 and file system control 908. Segmenter 904, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 908, also referred to as a file system manager, processes information to indicate the segment(s) association with a file. In some embodiments, a list of fingerprints is used to indicate segment(s) associated with a file. File system control 908 passes segment association information (e.g., representative data such as a fingerprint) to index 924. Index 924 is used to locate stored segments in storage units 910 via storage unit interface 912. Duplicate eliminator 906, also referred to as a segment store, identifies whether a newly received segment has already been stored in storage units 910. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 910 that make up the file. Segments are then packed by a container manager (which may be implemented as part of storage unit interface 912) into one or more storage containers stored in storage units 910. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 902 is configured to communicate with file system control 908 to identify appropriate segments stored in storage units 910 via storage unit interface 912. Storage unit interface 912 may be implemented as part of a container manager. File system control 908 communicates (e.g., via segmenter 904) with index 924 to locate appropriate segments stored in storage units via storage unit interface 912. Appropriate segments are retrieved from the associated containers via the container manager and are used to construct the requested file. The file is provided via interface 902 in response to the request. In one embodiment, file system control 908 utilizes a tree (e.g., a segment tree obtained from namespace 920) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 901 may be implemented in software, hardware, or a combination thereof. For example, deduplication engine 901 may be implemented in a form of executable instructions that can be stored in a machine-readable storage medium, where the instructions can be executed in a memory by a processor.

In one embodiment, storage system 900 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for verifying data integrity for garbage collection with limited memory, the method comprising:
   traversing, by a garbage collector executed by a processor, a namespace of a file system of a storage system to verify data integrity of segments arranged in a plurality of levels in a hierarchy, wherein an upper level segment includes one or more references to one or more lower level segments, wherein each file of the file system includes one or more of the segments, wherein traversing the namespace comprises:
   maintaining a data structure, wherein the data structure includes a plurality of entries, each storing states of a group of a predetermined number of the plurality of segments compressed therein,
   in response to receiving a request for transitioning a first of the plurality of segments from a first state to a second state, retrieving a first entry value of a first of the plurality entries associated with the first segment,
   generating a second entry value based on the first entry value, the first state, the second state, and a value obtained from a first lookup table based on the first segment, and
   writing back the second entry value to the first entry of the data structure; and
   in response to determining all entries of the data structure reach a predetermined final state, performing a garbage collection process on the segments stored in the storage system.

2. The method of claim 1, wherein the second entry value is generated based on a difference between a value corresponding to the first state and a value corresponding to the second state, multiplied by the value obtained from the first lookup table.

3. The method of claim 1, wherein a state of the first segment is determined based on a value obtained from a second lookup table based on the first segment and further based on an entry value of an entry in the data structure associated with the first segment.

4. The method of claim 3, wherein the second lookup table includes a plurality of entries, wherein a number of entries in the second lookup table is determined based on the predetermined number of segments compressed in each of the plurality of groups within the data structure and a size of each entry of the data structure.

5. The method of claim 4, wherein a value populated in each of the entries of the second lookup table is determined based on the values of the entries in the first lookup table, and a number of states that are represented by the data structure for each segment.

6. The method of claim 5, wherein an entry in the second lookup table at a location identified by a first index and a second index is populated with a value equal to the second index divided by a value obtained from an entry of the first lookup table at a location identified by the first index, and a quotient of the division is modulo by a value equal to the number of states that are represented by the data structure for each segment.

7. The method of claim 1, wherein the first lookup table includes a plurality of entries, wherein a number of entries in the first lookup table and a value populated in each of the entries of the first lookup table are determined based on the predetermined number of segments compressed in each of the plurality of groups within the data structure.

8. A non-transitory computer-readable medium having computer instructions stored therein, which when executed by a processor, cause the processor to perform operations comprising:
   traversing, by a garbage collector executed by a processor, a namespace of a file system of a storage system to verify data integrity of segments arranged in a plurality of levels in a hierarchy, wherein an upper level segment includes one or more references to one or more lower level segments, wherein each file of the file system includes one or more of the segments, wherein traversing the namespace comprises:
   maintaining a data structure, wherein the data structure includes a plurality of entries, each storing states of a group of a predetermined number of the plurality of segments compressed therein,
   in response to receiving a request for transitioning a first of the plurality of segments from a first state to a second state, retrieving a first entry value of a first of the plurality entries associated with the first segment,
   generating a second entry value based on the first entry value, the first state, the second state, and a value obtained from a first lookup table based on the first segment, and
   writing back the second entry value to the first entry of the data structure; and
   in response to determining all entries of the data structure reach a predetermined final state, performing a garbage collection process on the segments stored in the storage system.

9. The non-transitory computer-readable medium of claim 8, wherein the second entry value is generated based on a difference between a value corresponding to the first state and a value corresponding to the second state, multiplied by the value obtained from the first lookup table.

10. The non-transitory computer-readable medium of claim 8, wherein a state of the first segment is determined based on a value obtained from a second lookup table based on the first segment and further based on an entry value of an entry in the data structure associated with the first segment.

11. The non-transitory computer-readable medium of claim 10, wherein the second lookup table includes a plurality of entries, wherein a number of entries in the second lookup table is determined based on the predetermined number of segments compressed in each of the plurality of groups within the data structure and a size of each entry of the data structure.

12. The non-transitory computer-readable medium of claim 11, wherein a value populated in each of the entries of the second lookup table is determined based on the values of the entries in the first lookup table, and a number of states that are represented by the data structure for each segment.

13. The non-transitory computer-readable medium of claim 12, wherein an entry in the second lookup table at a location identified by a first index and a second index is populated with a value equal to the second index divided by a value obtained from an entry of the first lookup table at a location identified by the first index, and a quotient of the division is modulo by a value equal to the number of states that are represented by the data structure for each segment.

14. The non-transitory computer-readable medium of claim 8, wherein the first lookup table includes a plurality of entries, wherein a number of entries in the first lookup table and a value populated in each of the entries of the first lookup table are determined based on the predetermined number of segments compressed in each of the plurality of groups within the data structure.

15. A data processing system, comprising:

a processor; and a memory coupled to the processor for storing instructions which when executed from the memory, cause the processor to traverse a namespace of a file system of a storage system to verify data integrity of segments arranged in a plurality of levels in a hierarchy, wherein an upper level segment includes one or more references to one or more lower level segments, wherein each file of the file system includes one or more of the segments, wherein traversing the namespace comprises maintaining a data structure, wherein the data structure includes a plurality of entries, each storing states of a group of a predetermined number of the plurality of segments compressed therein, in response to receiving a request for transitioning a first of the plurality of segments from a first state to a second state, retrieving a first entry value of a first of the plurality entries associated with the first segment, generating a second entry value based on the first entry value, the first state, the second state, and a value obtained from a first lookup table based on the first segment, and writing back the second entry value to the first entry of the data structure; and in response to determining all entries of the data structure reach a predetermined final state, perform a garbage collection process on the segments stored in the storage system.

16. The data processing system of claim 15, wherein the second entry value is generated based on a difference between a value corresponding to the first state and a value corresponding to the second state, multiplied by the value obtained from the first lookup table.

17. The data processing system of claim 15, wherein a state of the first segment is determined based on a value obtained from a second lookup table based on the first segment and further based on an entry value of an entry in the data structure associated with the first segment.

18. The data processing system of claim 17, wherein the second lookup table includes a plurality of entries, wherein a number of entries in the second lookup table is determined based on the predetermined number of segments compressed in each of the plurality of groups within the data structure and a size of each entry of the data structure.

19. The data processing system of claim 18, wherein a value populated in each of the entries of the second lookup table is determined based on the values of the entries in the first lookup table, and a number of states that are represented by the data structure for each segment.

20. The data processing system of claim 19, wherein an entry in the second lookup table at a location identified by a first index and a second index is populated with a value equal to the second index divided by a value obtained from an entry of the first lookup table at a location identified by the first index, and a quotient of the division is modulo by a value equal to the number of states that are represented by the data structure for each segment.

21. The data processing system of claim 15, wherein the first lookup table includes a plurality of entries, wherein a number of entries in the first lookup table and a value populated in each of the entries of the first lookup table are determined based on the predetermined number of segments compressed in each of the plurality of groups within the data structure.

* * * * *